(12) United States Patent
Harb et al.

(10) Patent No.: US 12,190,355 B2
(45) Date of Patent: Jan. 7, 2025

(54) SYSTEMS AND METHODS TO IMPROVE PRESENTATION OF ADVERTISEMENTS

(71) Applicant: Rovi Guides, Inc., San Jose, CA (US)

(72) Inventors: Reda Harb, Bellevue, WA (US); Vishwas Sharadanagar Panchaksharaiah, Tiptur (IN); Poovarasan Chitravel, Tamilnadu (IN); Pawan Nagdeve, Bangalore (IN); Gudimetla Baby, Andhra Pradesh (IN); Sambeet Burma, Bangalore (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/479,764

(22) Filed: Sep. 20, 2021

(65) Prior Publication Data
US 2023/0088155 A1    Mar. 23, 2023

(51) Int. Cl.
*G06Q 30/02*    (2023.01)
*G06Q 30/0251*    (2023.01)
(Continued)

(52) U.S. Cl.
CPC ..... *G06Q 30/0269* (2013.01); *G06Q 30/0255* (2013.01); *G06Q 30/0633* (2013.01); *G06Q 50/01* (2013.01)

(58) Field of Classification Search
CPC ........... G06Q 30/0269; G06Q 30/0255; G06Q 30/0633; G06Q 50/01; G06Q 30/02;
(Continued)

(56) References Cited

U.S. PATENT DOCUMENTS

| 7,356,490 | B1 * | 4/2008 | Jacobi | G06Q 30/0631 |
| | | | | 705/26.8 |
| 9,066,115 | B1 * | 6/2015 | Cherry | H04N 21/8586 |

(Continued)

FOREIGN PATENT DOCUMENTS

| CN | 110800012 A * | 2/2020 | ............. G06Q 30/02 |
| JP | 6706334 B2 * | 6/2020 | ............. G06Q 30/06 |

(Continued)

OTHER PUBLICATIONS

Yuan, Yuan; Liu, Tracy; Tan, Chenhao; Chen, Qian; Pentland, Alex; Tang, Jie, Gift Contagion in Online Groups: Evidence From Virtual Red Packets (English), Jun. 26, 2019 (Year: 2019).*

(Continued)

*Primary Examiner* — Marilyn G Macasiano
(74) *Attorney, Agent, or Firm* — Haley Guiliano LLP

(57) ABSTRACT

Systems and methods are provided for generating an advertisement for output based on an item on a wish list. A request to obtain media content is received at a computing device, and a user profiled associated with the media content is identified. A wish list associated with the user profile is accessed, and an item on the wish list is identified. A first advertisement is identified, wherein the first advertisement is based on the identified item. A representation of the first advertisement and the media content are received at the computing device. A representation of the first advertisement and the media content are generated for output at the computing device.

20 Claims, 10 Drawing Sheets

(51) Int. Cl.
*G06Q 30/0601* (2023.01)
*G06Q 50/00* (2012.01)

(58) Field of Classification Search
CPC ............ G06Q 30/0254; G06Q 10/067; G06Q 30/0246; G06Q 30/0207
See application file for complete search history.

(56) References Cited

U.S. PATENT DOCUMENTS

| | | | | |
|---|---|---|---|---|
| 9,760,934 | B1* | 9/2017 | Field | G06Q 30/0631 |
| 10,262,346 | B2* | 4/2019 | Glass | G06Q 30/06 |
| 10,432,690 | B1* | 10/2019 | Li | H04L 65/612 |
| 10,779,029 | B1* | 9/2020 | Liu | H04N 21/23106 |
| 10,951,960 | B1* | 3/2021 | Wu | H04N 21/47202 |
| 11,170,451 | B2* | 11/2021 | Schneider | G06Q 50/01 |
| 2009/0177695 | A1* | 7/2009 | Mahajan | G06Q 30/02 |
| 2012/0209795 | A1* | 8/2012 | Glickman | G06Q 30/0242 |
| | | | | 706/12 |
| 2013/0024211 | A1* | 1/2013 | Monteforte | G06Q 30/0268 |
| | | | | 705/3 |
| 2013/0347032 | A1* | 12/2013 | Geraci | H04N 21/47815 |
| | | | | 725/34 |
| 2014/0173653 | A1* | 6/2014 | Waibel | H04N 21/23418 |
| | | | | 725/34 |
| 2014/0244405 | A1* | 8/2014 | Cohen | G06Q 30/0276 |
| | | | | 705/14.72 |
| 2014/0279205 | A1* | 9/2014 | Ganesh | G06Q 50/01 |
| | | | | 705/26.7 |
| 2016/0225022 | A1* | 8/2016 | Kurapati | G06F 16/958 |
| 2016/0358230 | A1* | 12/2016 | Wilson | G06Q 30/0277 |
| 2017/0018002 | A1* | 1/2017 | Champy | G06Q 30/0251 |
| 2017/0138736 | A1* | 5/2017 | Simon | G06T 11/206 |
| 2018/0227632 | A1* | 8/2018 | Rubin | H04N 21/4788 |

FOREIGN PATENT DOCUMENTS

| | | | | |
|---|---|---|---|---|
| WO | WO 2008/131247 A1 * | 10/2008 | | G06Q 30/00 |
| WO | WO 2013/184793 A1 * | 12/2013 | | G06F 15/16 |
| WO | WO 2016/118317 A1 * | 7/2016 | | H04N 5/44 |

OTHER PUBLICATIONS

ECommerce Method for Wish List Purchase Percentage Broadcasting to Social Networks (English (United States)), The IP.com Prior Art Database, Oct. 1, 2009 (Year: 2009).*

Tawei Liao, Methods, systems, and media for presenting video content items (English (Umited States)), The IP.com Prior Art Database, May 2, 2014 (Year: 2014).*

* cited by examiner

SYSTEMS AND METHODS TO IMPROVE PRESENTATION OF ADVERTISEMENTS

BACKGROUND

The present disclosure is directed towards systems and methods for generating an advertisement for output. In particular, systems and methods are provided herein that for generating an advertisement for output based on an item on a wish list.

SUMMARY

The proliferation of e-commerce sites, such as Amazon, has given rise to new approaches to shopping that utilize the connected nature of e-commerce sites. In particular, a user may add items to a wish list, and a user may share that wish list with, for example, their friends, family and/or colleagues to indicate items that they would like as gifts. For example, a user may share a wish list with family and friends in the run-up to a special event, such as a birthday. However, even if a user shares a wish list with family and friends, the family and friends may not be aware of the best place to purchase an item from the wish list. For example, if the wish list is associated with a particular e-commerce site, they may not be aware of sales and/or similar items that are available on other e-commerce sites. In another example, a user may have been sent the wish list but, for example, if the wish list was sent too far in advance of the event, the user may forget about the event. In another example, a user may have created a wish list but may be hesitant about sharing the wish list directly with friends, family and colleagues.

In view of the foregoing, it would be beneficial to have a system that is capable of generating an advertisement for output based on an item on a wish list.

Systems and methods are described herein for generating an advertisement for output based on an item on a wish list. In accordance with a first aspect of the disclosure, a method is provided for generating an advertisement for output based on an item on a wish list. The method includes receiving a request to obtain, at a computing device, media content and identifying a user profile associated with the media content. A wish list associated with the user profile is accessed, and an item on the wish list is identified. A first advertisement is identified, wherein the first advertisement is based on the identified item. A representation of the first advertisement and the media content are received at the computing device. The representation of the first advertisement and the media content are generated for output at the computing device. Accessing the wish list may further comprise accessing the wish list via an advertising exchange. Identifying the item on the wish list may further comprise identifying the item at the advertising exchange. Identifying the first advertisement may further comprise identifying the first advertisement based on a pre-cached bid. In an example system, a user may log on to an online video sharing platform, such as YouTube, via a tablet device. The user may select a video to watch. When the user selects a video to watch, a wish list associated with the user profile is accessed. For example, the user may have connected an e-commerce account to their account for the online video sharing platform and a wish list associated with the e-commerce account may be accessed. An item on the wish list is identified. This may comprise a general identification, such as identifying that a hairdryer is present on the wish list. In another example, this may comprise a specific identification, such as identifying the brand and model of a hairdryer on the wish list. An advertisement is identified based on the identified item, for example an advertisement directed towards the specific hairdryer on the wish list. In some examples, this advertisement is accessed via an advertising exchange. The advertisement and the selected media content are received at the tablet device, and a representation of the first advertisement is generated for output. For example, a first frame of the advertisement may be generated for output at the tablet device. In some examples, the entire advertisement may be generated for output and automatically output to the user before the media content is generated for output and output. In some examples, the user may have to interact with the representation of the advertisement before the advertisement is generated for output. In other examples, the user may be given an option to skip the advertisement and watch the media content.

A second advertisement may be identified, wherein the second advertisement is different from the first advertisement and the second advertisement is based on the identified item. A representation of the second advertisement may be received. The representation of the second advertisement and an interface may be generated for output at the computing device. The interface may comprise the representations of the first and second advertisements and enable a selection of the first or second advertisement to be received. A selection of the first or second advertisement is received at the computing device, the selected first or second advertisement is received at the computing device and the selected first or second advertisement is generated for output at the computing device. The first advertisement may be for the identified item, and the second advertisement may be for an item that is similar to the identified item. The interface may further comprise a reminder that indicates an indication of the wish list from which the item has been identified and a date associated with the wish list. Continuing the above example, after a user selects a media content item on a video sharing platform, but before the media content is generated for output for the user, representations for two advertisements may be received at the tablet device and representations may be generated for output along with a user interface. For example, the user interface may invite the user to select one of the two advertisements. The first advertisement may be for a specific item on the wish list, and the second advertisement may be for a similar item. For example, the first advertisement may be directed towards the specific brand and model of hairdryer that is on the wish list, and the second advertisement may be directed towards a different brand and/or model of hairdryer. The user may select one of the representations of the advertisements and, upon the system receiving the selection, that advertisement may be received and generated for output before the media content is output to the user. The user interface may also comprise a countdown timer, for example for five seconds, ten seconds or fourteen seconds, after which a default advertisement is shown to the user. In some examples, the user interface may comprise a reminder. The reminder may provide an indication of the wish list from which the item has been identified, for example, "Tim's Wish List." In another example, the reminder may provide a date associated with the wish list, for example, "Tim's Birthday Wish List—Sunday, December 5."

The wish list may be associated with a user, and an indication that the identified item on the wish list has not been purchased for the user may be received. For example, a wish list that is associated with an e-commerce site may be updated in real time, or substantially real time, such that when an item on a wish list is purchased for a user, the wish list is updated to indicate that the item has been purchased. In this way, advertisements are not output for items that have already been purchased for the user.

Identifying the first advertisement may further comprise generating the first advertisement by scraping a webpage associated with the identified item; extracting, from the webpage, one or more data items associated with the identified item; and processing the one or more data items. Receiving the first advertisement may further comprise receiving the generated advertisement. For example, an advertisement may not have been created for an item on the wish list; however, a manufacturer may have a promotional video on their website. The manufacturer's website may be scraped in order to extract the promotional video, and the promotional video may be used as the advertisement. In other examples, a format of the video may be altered before it is sent to a user. For example, if the promotional video on the manufacturer's website is in a high definition, it may be transcoded to a lower definition. In a similar manner, if the promotional video is in a high resolution, it may be transcoded to a lower resolution. This transcoding may be based on the capabilities of the device receiving the advertisement. In other examples, other data such as up-to-date prices, promotional sales and/or any other information may be scraped from a website, such as an e-commerce website, and may form at least a part of the advertisement that is sent to the computing device.

Obtaining the media content may further comprise receiving a manifest file, the manifest file indicating a plurality of media content segments. Receiving the first advertisement may further comprise adding a plurality of first advertisement segments to the manifest file. The manifest file may be an HTML 5 manifest file, such as a media presentation description file (.mpd) file for MPEG DASH streaming. The manifest file may describe media content segments for streaming media content and may be appended to describe segments of the advertisement. The manifest file is typically received before any advertisement and/or media content is received at the computing device.

Accessing the wish list may further comprise accessing the wish list via a social network associated with the user profile, and a provider of the media content may be associated with the user profile via the social network. In an example, a user may log on to an over-the-top (OTT) platform, such as Disney+. The user may have a social network account associated with their OTT platform account. In some examples, the user may use their social network account to log on to the OTT platform. The user may have a wish list stored as part of their social media profile, which may be accessed via the OTT platform. The OTT platform may have an account on the social media platform that a user is connected to, and by connecting to the OTT platform account, the user may enable the OTT platform account to access parts of their social media profile, such as the wish list.

The interface may further enable an item, based on the representations of the first and/or second advertisements, to be purchased via the user interface. For example, the user interface may comprise a selectable element that a user can use to purchase the item. In some examples, the user may already be logged on to an e-commerce site, and the selectable element may enable the user to purchase the item without having to provide any additional details. In some examples, if the item is a digital download, then the digital download may automatically be sent to the subject of the wish list, for example, a link to download and/or activate a game and/or digital media content may be sent to the subject of the wish list. In some examples, the digital content may be automatically installed on a computing device associated with subject of the wish list.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

Figure 9:
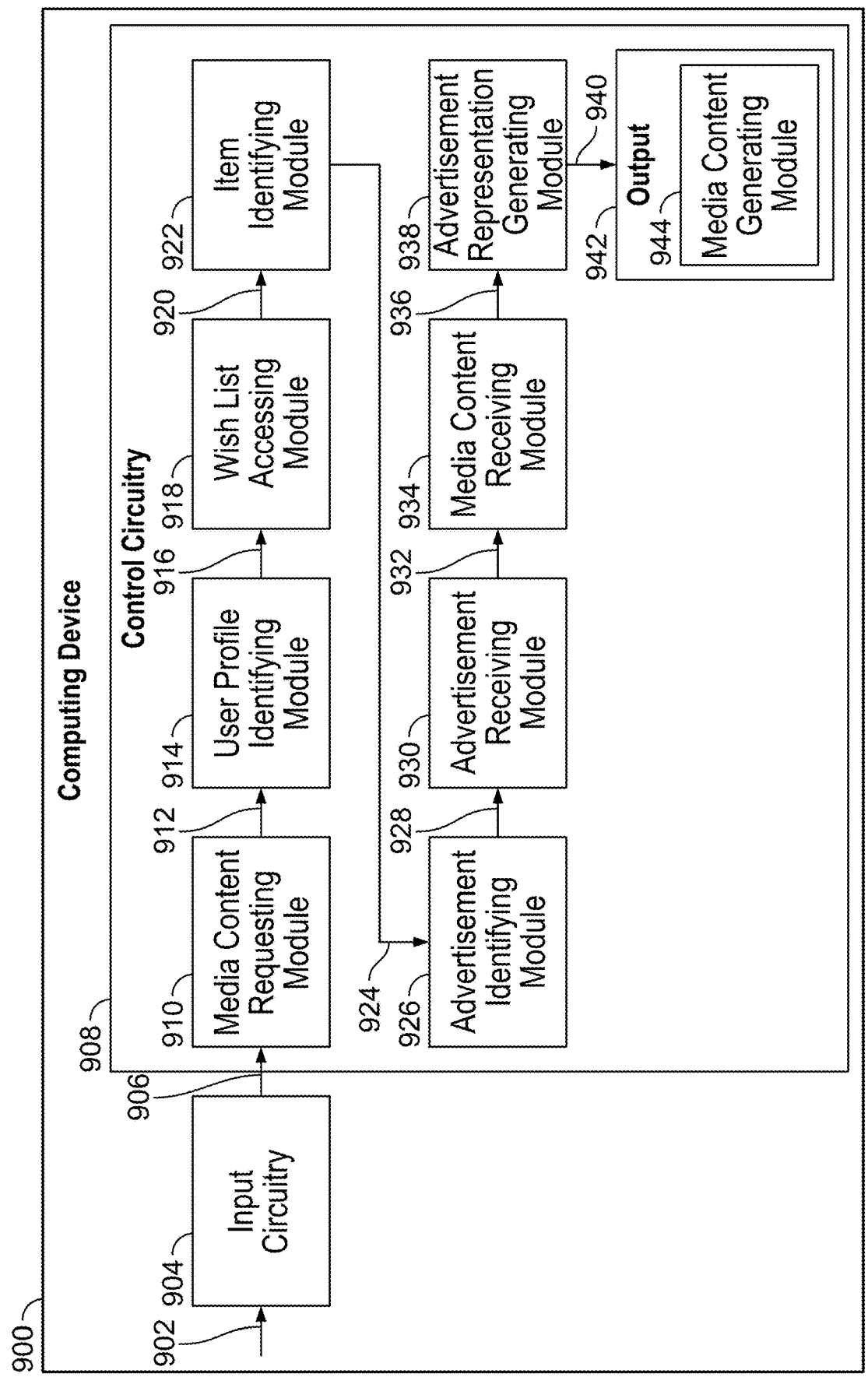
Figure 10:
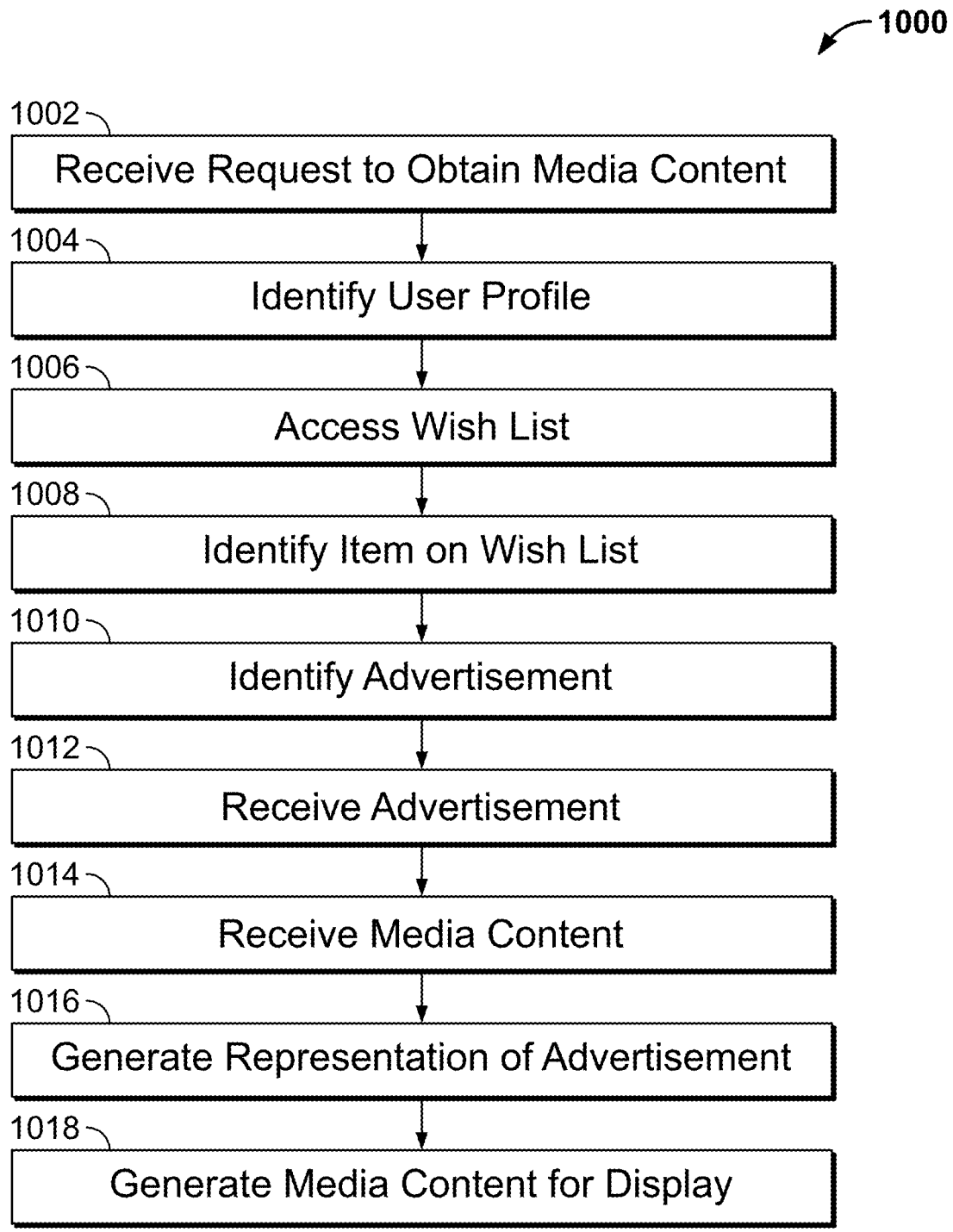

FIG. 9 shows a block diagram representing components of a computing device and data flow therebetween for generating an advertisement for output based on an item on a wish list, in accordance with some embodiments of the disclosure; and FIG. 10 shows a flowchart of illustrative steps involved in generating an advertisement for output based on an item on a wish list, in accordance with some embodiments of the disclosure.

DETAILED DESCRIPTION

Systems and methods are described herein for generating an advertisement for output based on an item on a wish list. A wish list can comprise any list of items. It may comprise a list of items that have been selected by a user for themself (i.e., the user is the subject of the wish list). In another example, a wish list may comprise a list of items that have been selected by a first person for a second person. In some examples, the subject of the wish list may be a group of people. In other examples, the subject of the wish list may be an animal. A wish list may form part of an e-commerce site. For example, as a user is browsing an e-commerce site, they may be presented with an option that enables them to add one or more items to a wish list. In other examples, a user may curate a wish list by manually adding items to a wish list. In some examples, a wish list may be generated automatically, based on the browsing and/or viewing history of a user. A wish list may comprise detailed information about the items on the wish list, for example, the wish list may include a brand, model, price and/or a web-link related to the item. In other examples, the wish list may simply comprise an indication of an item, such as "laptop."

Generating for output includes generating for display, generating for audio output and generating for a combination of display and audio output. Media content includes audio, video and/or any other media content. Audio includes audio-only content, such as podcasts, stories and music. Video includes audiovisual content such as movies and/or television programs. An over-the-top (OTT) content platform may be accessed via a website and/or an app running on a computing device and may receive any type of media content, including live media content and/or on-demand media content. Although the embodiments below may discuss receiving media content from a server, via a network such as the internet, media content may also be received via cable, satellite and/or a terrestrial broadcasting network.

An advertisement is any media content that describes an item. For example, it may comprise audio, video and/or a still image. It may comprise data describing the item, such as a price of the item. In some examples, an advertisement may comprise a link and/or a quick response (QR) code to an e-commerce site selling the item. An advertisement may be interactive, for example, enabling a user to play a game. A representation of an advertisement is any media content based on the advertisement. For example, it may comprise a still from a video, a text description, a short clip and/or an animation. The representation of the advertisement enables something to be output at a computing device before the advertisement is output. In some examples, it may aid a user in selecting an advertisement.

The disclosed methods and systems may be implemented on one or more computing devices. As referred to herein, the computing device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, an augmented reality device, a mixed reality device, a virtual reality device, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

Figure 1:
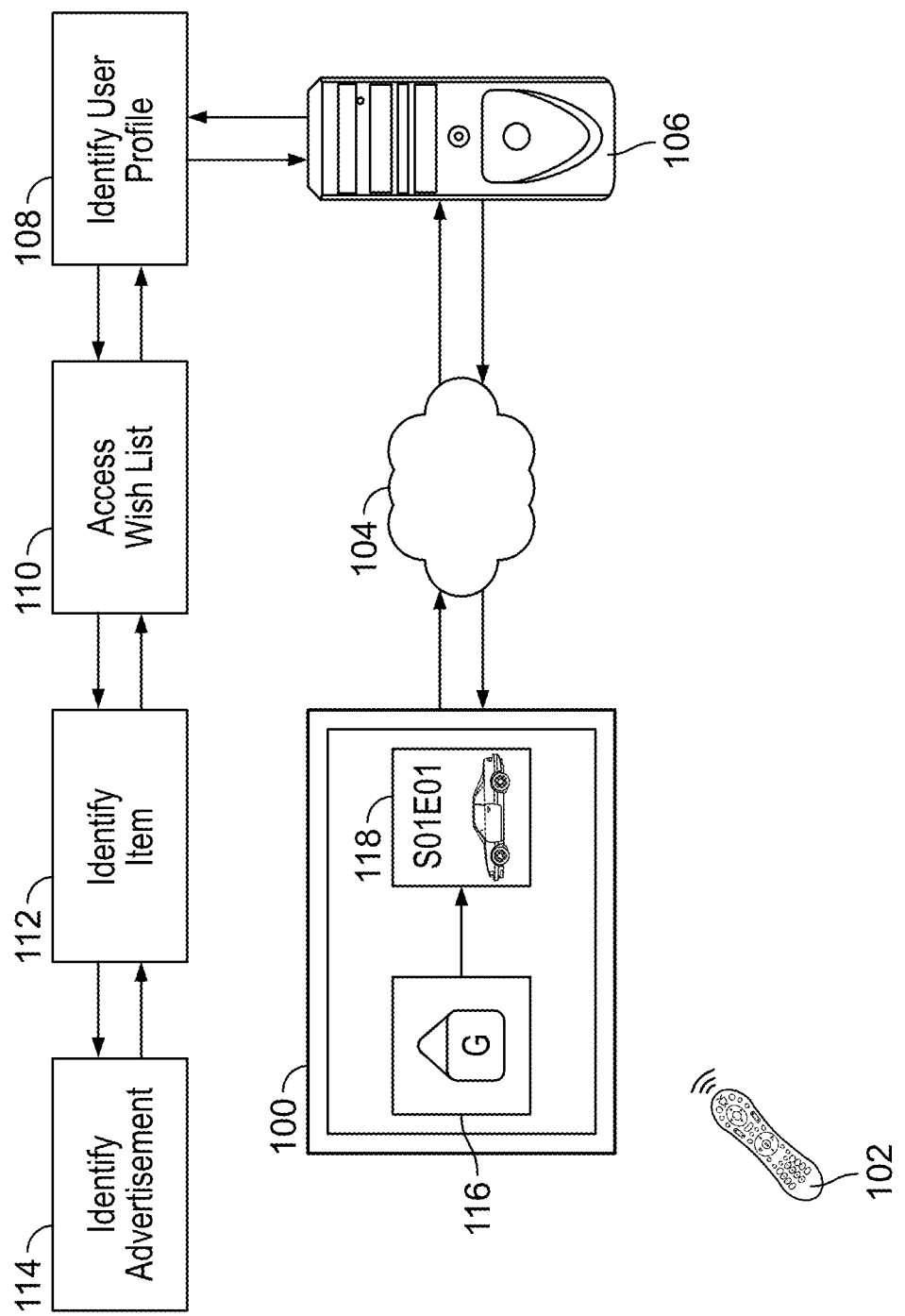
FIG. 1 shows an example environment in which an advertisement, based on an item on a wish list, is generated for output, in accordance with some embodiments of the disclosure.

FIG. 1 shows an example environment in which an advertisement, based on an item on a wish list, is generated for output, in accordance with some embodiments of the disclosure. The environment comprises a computing device, in this example, a smart television 100. A user selects a media content item for viewing via a video sharing application, or an OTT application, with the remote control 102. The remote control 102 is communicably coupled to the smart television 100 via infrared, Bluetooth and/or Wi-Fi. In some examples, the remote control may be an application running on a computing device, such as a smartphone or a tablet. A request to obtain the media content item is sent via a network 104, such as the internet, to a server 106. The network may comprise wired and/or wireless means for transmitting the request to the server 106. In some examples, the server 106 is an edge server. In this example, the following steps 108, 110, 112 and 114 are carried out at the same server 106 that receives the request; however, any (including all) of the steps may be carried out at one or more other servers. These other servers may be different physical servers, different virtual machines running on the same server and/or a combination of the two. At the server 106, a user profile is identified 108. For example, this may be a user profile that a user uses to log on to a video sharing platform, an OTT platform or the smart television 100. In some examples, the same profile may be used to log on to two or more services and/or devices. A wish list associated with the user profile is accessed 110. For example, a user may have linked a profile that they use to log on to a video sharing platform, an OTT platform or the smart television 100 with an e-commerce website on which they have created a wish list. An item on the wish list is identified 112 and, based on the identified item on the wish list, an advertisement is identified 114. A representation of the advertisement 116 is transmitted from the server 106, via the network 104, to the smart television 100, where it is generated for output. The advertisement associated with the representation of the advertisement 116 may be sent to the smart television 100, via the network 104, and be automatically generated for output. In other examples, a user may need to interact with the representation of the advertisement 116 before the advertisement is generated for output. In other examples, the user may interact with the advertisement, for example, by selecting the advertisement in order to output more information about the item shown in the advertisement, or to purchase an item described in the advertisement. Once the representation of the advertisement 116 and/or the advertisement is generated for output and is output at the smart television 100, the media content 118 is generated for output at the smart television 100. The media content 118 is received via the network 104, from the server 106, and may be cached while the selected advertisement is being output at the smart television 100. In other examples, the media content may be received after the selected advertisement is output at the smart television 100.

In some examples, a wish list service provider collates multiple wish lists from multiple users and tracks who the users share their wish list(s) with. The wish list service provider may make the wish lists available to an advertisement exchange, for example through a demand-side platform. An item on a wish list can be identified based on a pre-cached bid, in order to fill an order. The advertisement exchange can also exchange data with buyers of advertisements that a user profile meets a specific criterion, or criteria, for example, that an item on a wish list was shared with the user profile. In this way buyers of advertisements can bid on showing an advertisement on a device associated with the user profile. The exchange may select the winning bid, receive instructions for publishing the advertisement, for example via an advertisement server, and the advertisement creatives, for example a link to an XML file that comprises information relating to the advertisement. The advertising exchange may transmit this information to an advertisement publisher, for example through a supply side platform, such that the computing device at which the user profile associated with the winning bid is logged on to receives the advertisement creatives and generates the advertisement for display. In some examples, bids can be made and received in real time, for example, in response to a user selecting "play" at a media player. Real time bids may be made by an automated bidding system. The choice of the advertisement format available for a user can be presented a few seconds before an advertisement timepoint is reached. For example, an option to receive regular advertisements and/or wish list advertisements may be generated for output via a user interface. In another example, a settings menu may allow a user to select a global setting to receive regular advertisements and/or wish list advertisements.

Figure 2:
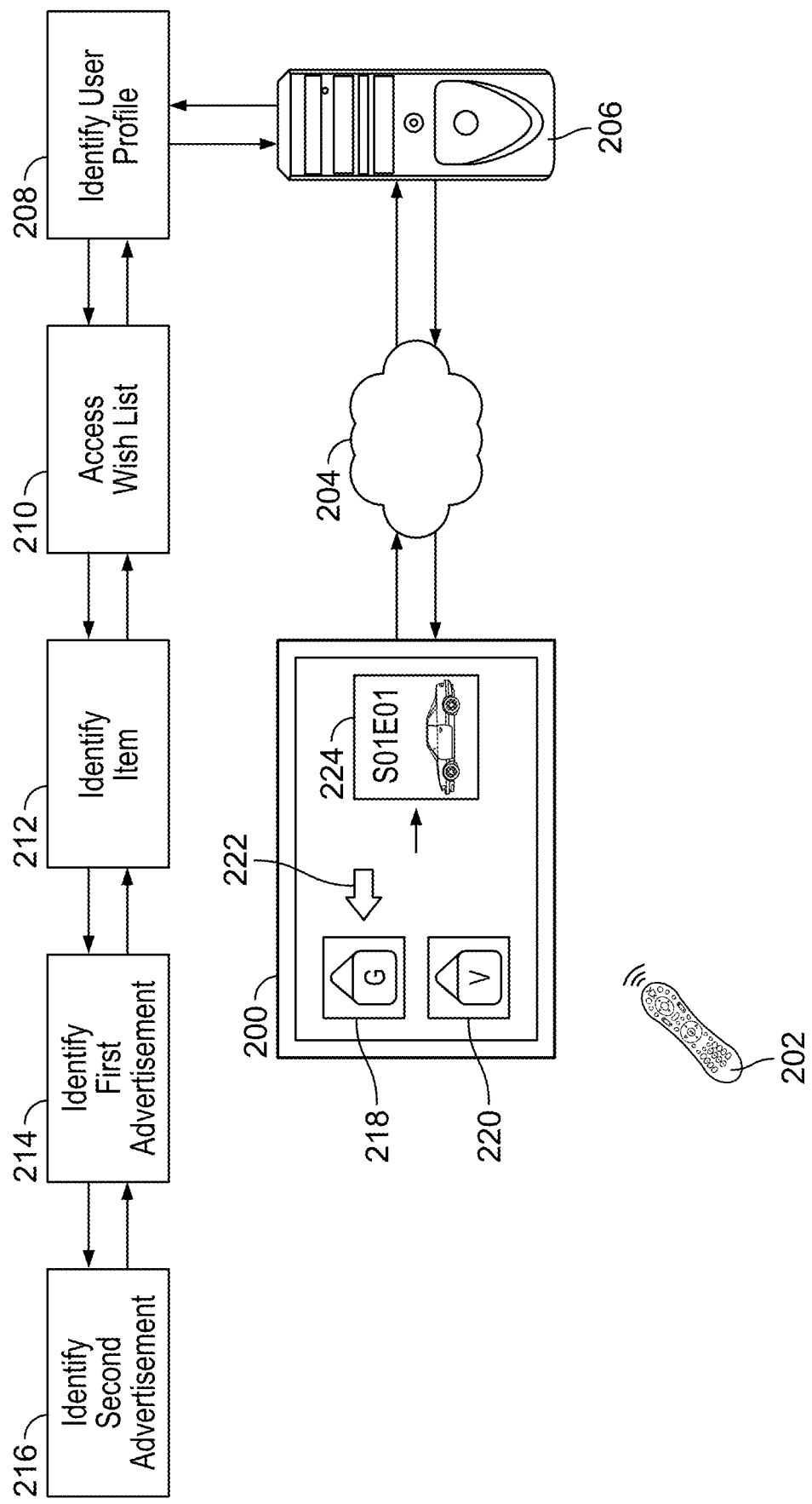
FIG. 2 shows another example environment in which an advertisement, based on an item on a wish list, is generated for output, in accordance with some embodiments of the disclosure.

FIG. 2 shows another example environment in which an advertisement, based on an item on a wish list, is generated for output, in accordance with some embodiments of the disclosure. In a similar manner to the environment depicted in FIG. 1, the environment comprises a computing device, in this example, a smart television 200. A user selects a media content item for viewing on a video sharing application, or an OTT application, with the remote control 202. A request to obtain the media content item is sent via a network 204, such as the internet, to a server 206. In this example, the following steps 208, 210, 212, 214 and 216 are carried out at the same server 206 that receives the request; however, any (including all) of the steps may be carried out at one or more other servers. These other servers may be different physical servers, different virtual machines running on the same server and/or a combination of the two. At the server 206, a user profile is identified 208. A wish list associated with the user profile is accessed 210. An item on the wish list is identified 212 and, based on the identified item on the wish list, a first advertisement is identified 214 and a second advertisement is identified 216.

In an example, one or more items on the wish list are somewhat related to the media content. For example, if the media content comprises a character applying make-up, the first advertisement may be for make-up and the second advertisement may also be for make-up. Metadata such as price and whether the product is an original item on the wish list or is similar to an item on the wish list can be displayed as part of the representation of the advertisement and/or the advertisement to help the user select an item. In another example, a user can set a preference that filters the wish list items, such that only advertisements for items that meet a certain criterion (e.g., show advertisements for items on the wish list that cost less than $40) are generated for display. In another example, a user can be presented with a user interface element that enables the user to randomly order any item on a wish list that is less than, for example, a certain price, such as $40. For example, this feature can be offered through a "Surprise Me" button. In another example, a notification can be sent to the user. For example, an ordered item can be automatically added to a user's "Current Orders" on an e-commerce site. In any of the above examples the user interface element may be replace by and/or supplemented with a voice command.

The first advertisement may reflect the exact item that is on the wish list, for example the same brand and model of item. The second advertisement may be for an item that is similar to the item that is shown in the first advertisement, for example, the same type of item, but a different brand and/or model. The second advertisement may, in some examples, be for an item that is on sale or is at a lower price compared to the first advertisement. A representation of the first advertisement 218 and a representation of the second advertisement 220 are transmitted from the server 206, via the network 204, to the smart television 200, where they are generated for output, along with a user interface 222. The user interface may enable a user to select the representation of the first advertisement 218 or the representation of the second advertisement 220 for output. The user may use the remote control 202 to select the advertisement for output. In other examples, the user may generate a touch event on the touchscreen of a computing device in order to select an advertisement. The selected advertisement is sent to the smart television 200, via the network 204, and may be automatically generated for output. In other examples, the user may interact with the advertisement, for example, by selecting the advertisement in order to output more information about the item shown in the advertisement, or to purchase an item described in the advertisement. Once the selected advertisement is generated for output and is output at the smart television 200, the media content 224 is generated for output at the smart television 200. The media content 224 is received via the network 204, from the server 206.

Figure 3:
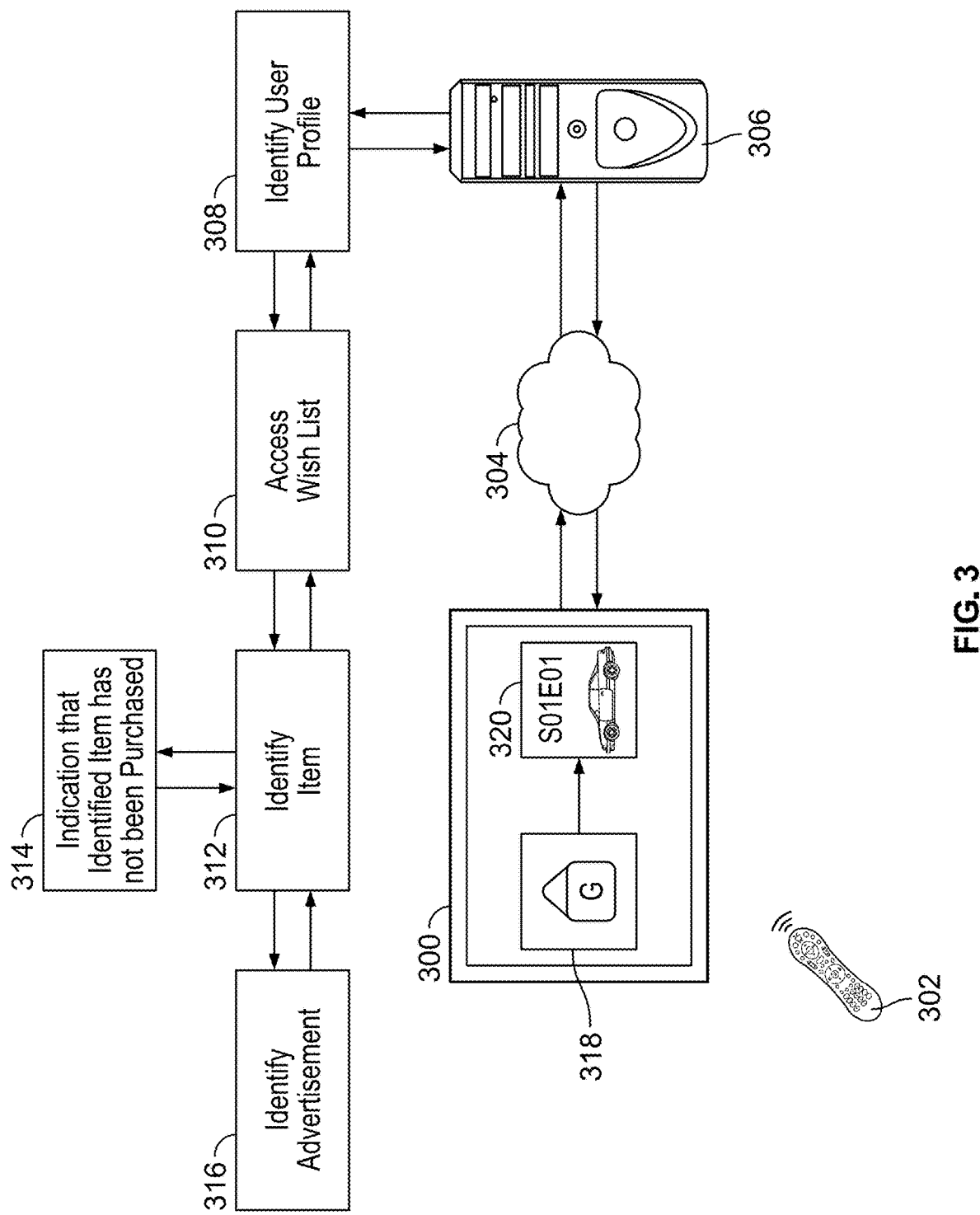
FIG. 3 shows another example environment in which an advertisement, based on an item on a wish list, is generated for output, in accordance with some embodiments of the disclosure.

FIG. 3 shows another example environment in which an advertisement, based on an item on a wish list, is generated for output, in accordance with some embodiments of the disclosure. In a similar manner to the environment depicted in FIGS. 1 and 2, the environment comprises a computing device, in this example, a smart television 300. A user selects a media content item for viewing via a video sharing application, or an OTT application, with the remote control 302. A request to obtain the media content item is sent via a network 304, such as the internet, to a server 306. In this example, the following steps 308, 310, 312, 314 and 316 are carried out at the same server 306 that receives the request; however, any (including all) of the steps may be carried out at one or more other servers. These other servers may be different physical servers, different virtual machines running on the same server and/or a combination of the two. At the server 306, a user profile is identified 308. A wish list associated with the user profile is accessed 310. An item on the wish list is identified 312, and it is identified whether or not the item has been purchased 314. For example, a wish list that is associated with an e-commerce site may be updated in real time, or substantially real time, such that when an item on a wish list is purchased for a user, the wish list is updated to indicate that the item has been purchased. If the item has been purchased, another item is identified. An advertisement is identified 316 based on the identified item on the wish list. A representation of the advertisement 318 is transmitted from the server 306, via the network 304, to the smart television 300, where it is generated for output. The advertisement associated with the representation of the advertisement 318 may be sent to the smart television 300, via the network 304, and be automatically generated for output. In other examples, a user may need to interact with the representation of the advertisement 318 before the advertisement is generated for output. In other examples, the user may interact with the advertisement, for example, by selecting the advertisement, in order to output more information about the item shown in the advertisement, or to purchase an item described in the advertisement. Once the representation of the advertisement 318 and/or the advertisement is generated for output and is output at the smart television 300, the media content 320 is generated for output at the smart television 300. The media content 320 is received via the network 304, from the server 306. In this example, a single representation of an advertisement is generated for output; however, it is also contemplated that two representations of advertisements may be generated for output in a similar manner to that described in connection with FIG. 2, wherein step 314 comprises identifying whether the same or a similar item from the wish list has been purchased.

Figure 4:
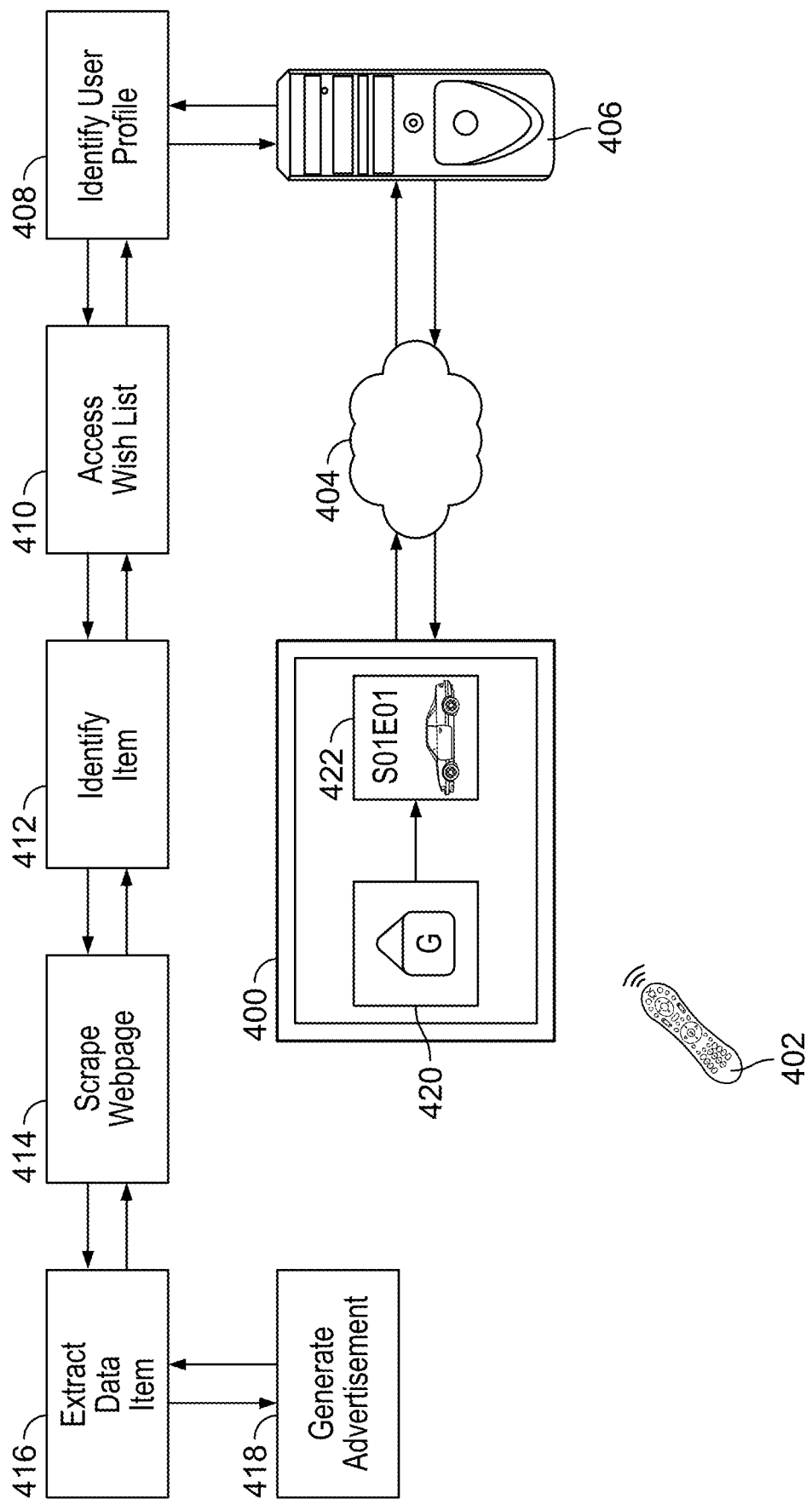
FIG. 4 shows another example environment in which an advertisement, based on an item on a wish list, is generated for output, in accordance with some embodiments of the disclosure.

FIG. 4 shows another example environment in which an advertisement, based on an item on a wish list, is generated for output, in accordance with some embodiments of the disclosure. In a similar manner to the environment depicted in FIGS. 1-3, the environment comprises a computing device, in this example, a smart television 400. A user selects a media content item for viewing via a video sharing application, or an OTT application, with the remote control 402. A request to obtain the media content item is sent via a network 404, such as the internet, to a server 406. In this example, the following steps 408, 410, 412, 414, 416, 418 and 420 are carried out at the same server 406 that receives the request; however, any (including all) of the steps may be carried out at one or more other servers. These other servers may be different physical servers, different virtual machines running on the same server and/or a combination of the two. At the server 406, a user profile is identified 408. A wish list associated with the user profile is accessed 410. An item on the wish list is identified 412.

Based on the identified item, a webpage is scraped 414, and a data item is extracted 416 from the webpage. For example, an advertisement may not have been created for an item on the wish list; however, a manufacturer may have a promotional video on their website. Image recognition may be utilized order to identify a brand and/or model of an item in an image associated with a wish list, and a web search may be automatically performed in order to identify an appropriate website. In this example, the manufacturer's website may be scraped in order to extract the promotional video, and the promotional video may be used as the advertisement. In other examples, a format of the video may be altered before it is sent to a user. For example, if the promotional video on the manufacturer's website is in a high definition, it may be transcoded to a lower definition. In a similar manner, if the promotional video is in a high resolution, it may be transcoded to a lower resolution. This transcoding may be based on the capabilities of the device receiving the advertisement. In other examples, other data such as up-to-date prices, promotional sales and/or any other information may be scraped from a website, such as an e-commerce website, and may form at least a part of the advertisement that is sent to the computing device.

In another example, the advertisement may be a product review that was posted or shared by a verified purchaser. For example, a product review video posted by a verified purchaser can be presented based on how many users indicated a positive response to the product review video. In some examples, a user may request, via a UI element in a user interface and/or an overlay, a top product review video after watching the advertisement in order to help decide whether to buy the item or not.

An advertisement is identified by generating an advertisement 418 based on the identified item on the wish list and the scraped data. A representation of the advertisement 418 is transmitted from the server 406, via the network 404, to the smart television 400, where it is generated for output. The advertisement associated with the representation of the advertisement 418 may be sent to the smart television 400, via the network 404 and be automatically generated for output. In other examples, a user may need to interact with the representation of the advertisement 418 before the advertisement is generated for output. In other examples, the user may interact with the advertisement, for example, by selecting the advertisement in order to output more information about the item shown in the advertisement, or to purchase an item described in the advertisement. Once the representation of the advertisement 418 and/or the advertisement is generated for output and is output at the smart television 400, the media content 420 is generated for output at the smart television 400. The media content 420 is received via the network 404, from the server 406. In this example, a single representation of an advertisement is generated for output; however, it is also contemplated that two representations of advertisements may be generated for output in a similar manner to that described in connection with FIG. 2, wherein webpages are scraped for either of, or both of, the identified advertisements.

Figure 5:
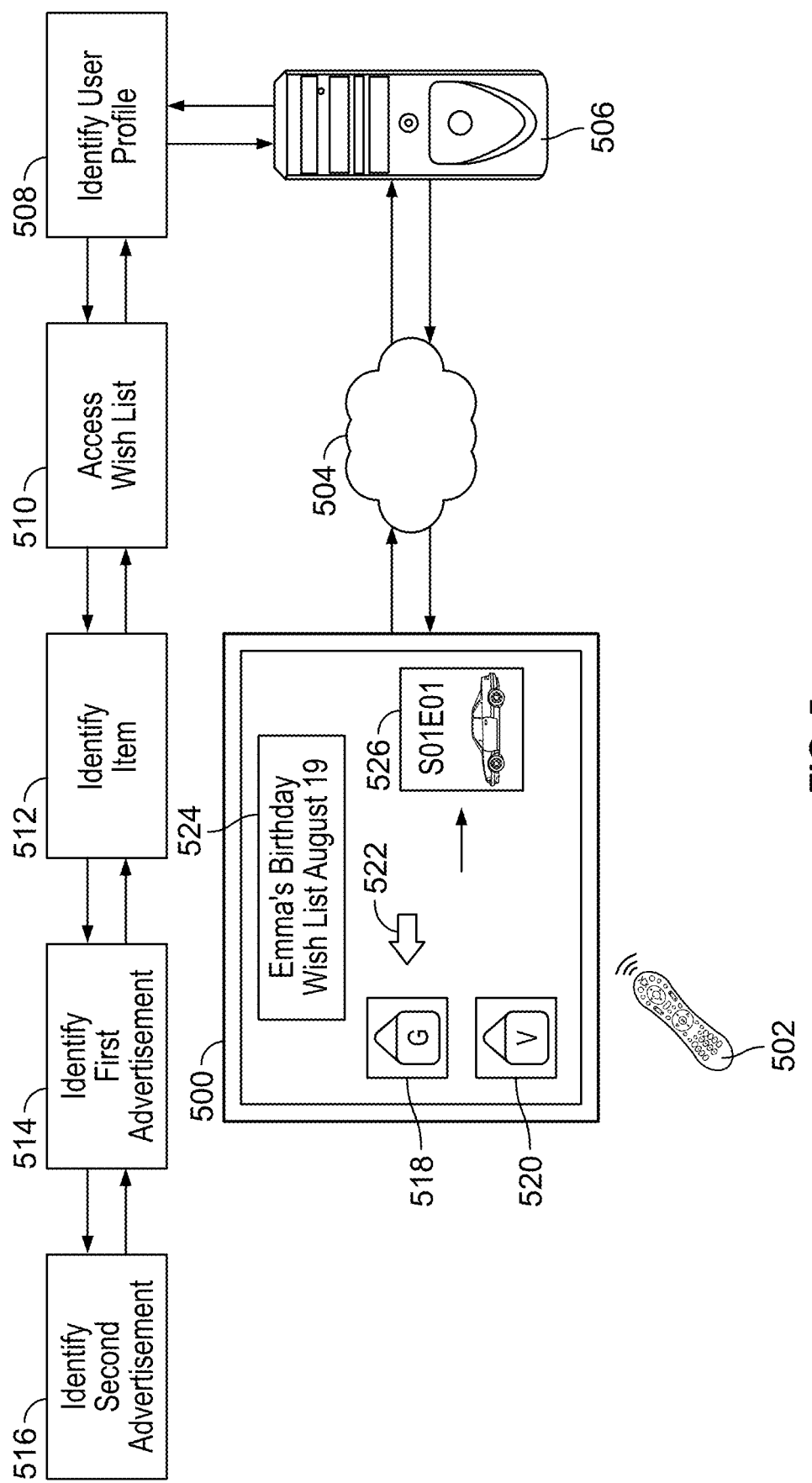
FIG. 5 shows another example environment in which an advertisement, based on an item on a wish list, is generated for output, in accordance with some embodiments of the disclosure.

FIG. 5 shows another example environment in which an advertisement, based on an item on a wish list, is generated for output, in accordance with some embodiments of the disclosure. In a similar manner to the environment depicted in FIGS. 1-4, the environment comprises a computing device, in this example, a smart television 500. A user selects a media content item for viewing on a video sharing application, or an OTT application, with the remote control 502. A request to obtain the media content item is sent via a network 504, such as the internet, to a server 506. In this example, the following steps 508, 510, 512, 514 and 516 are carried out at the same server 506 that receives the request; however, any (including all) of the steps may be carried out at one or more other servers. These other servers may be different physical servers, different virtual machines running on the same server and/or a combination of the two. At the server 506, a user profile is identified 508. A wish list associated with the user profile is accessed 510. An item on the wish list is identified 512 and, based on the identified item on the wish list, a first advertisement is identified 514 and a second advertisement is identified 516. The first advertisement may reflect the exact item that is on the wish list, for example, the same brand and model of item. The second advertisement may be for an item that is similar to the item that is shown in the first advertisement, for example, the same type of item, but a different brand and/or model. The second advertisement may, in some examples, be for an item that is on sale or is at a lower price compared to the first advertisement. A representation of the first advertisement 518 and a representation of the second advertisement 520 are transmitted from the server 506, via the network 504, to the smart television 500, where they are generated for output, along with a user interface 522. The user interface 522 may enable a user to select the representation of the first advertisement 518 or the representation of the second advertisement 520 for output. The user interface 522 also comprises a reminder 524 that is generated for output. The reminder may indicate a name of the wish list from which an item has been selected and/or may indicate a date associated with the wish list. In this example, the reminder is "Emma's Birthday Wish List August 19." The reminder indicates the name of the wish list, "Emma's Birthday Wish List" and a date associated with the wish list, "August 19." In some examples, an explicit date may be replaced with a countdown, for example, "in THREE days!" Data for including in the reminder may be obtained via the wish list itself. In other examples, a calendar associated with the user profile may be accessed and the wish list may be associated with an event in the calendar. The date may be obtained via the calendar. In another example, a trained machine learning model may be used to associate a wish list with an event of a plurality of events in a calendar. The user may use the remote control 502 to select the advertisement for output. In other examples, the user may generate a touch event on the touchscreen of a computing device in order to select an advertisement. The selected advertisement is sent to the smart television 500, via the network 504, and may be automatically generated for output. In other examples, the user may interact with the advertisement, for example, by selecting the advertisement in order to output more information about the item shown in the advertisement, or to purchase an item described in the advertisement. Once the selected advertisement is generated for output and is output at the smart television 500, the media content 526 is generated for output at the smart television 500. The media content 526 is received via the network 504, from the server 506.

Figure 6:
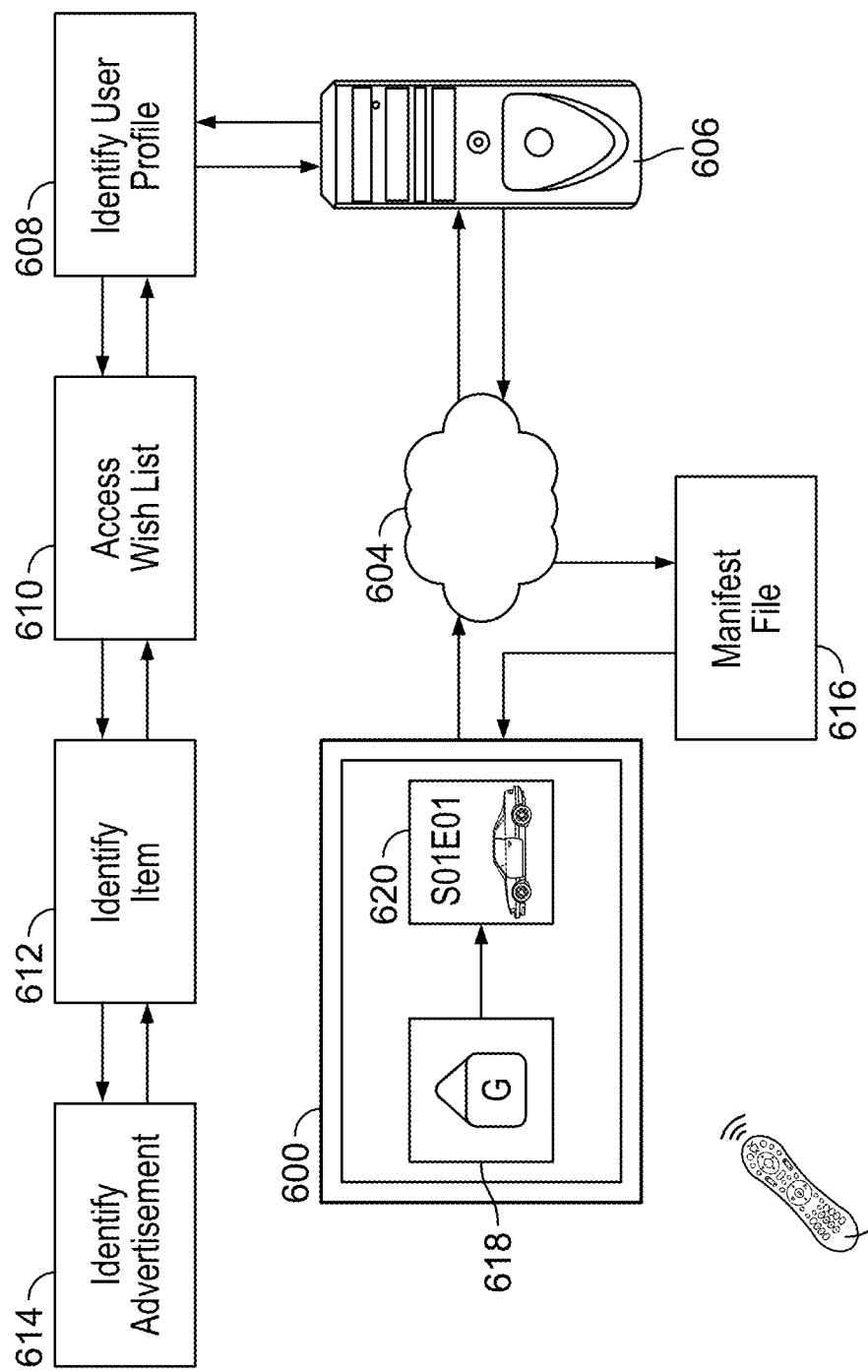
FIG. 6 shows another example environment in which an advertisement, based on an item on a wish list, is generated for output, in accordance with some embodiments of the disclosure.

FIG. 6 shows another example environment in which an advertisement, based on an item on a wish list, is generated for output, in accordance with some embodiments of the disclosure. In a similar manner to the environment depicted in FIGS. 1-5, the environment comprises a computing device, in this example, a smart television 600. A user selects a media content item for viewing via a video sharing application, or an OTT application, with the remote control 602. A request to obtain the media content item is sent via a network 604, such as the internet, to a server 606. In this example, the following steps 608, 610, 612 and 614 are carried out at the same server 606 that receives the request; however, any (including all) of the steps may be carried out at one or more other servers. These other servers may be different physical servers, different virtual machines running on the same server and/or a combination of the two. At the server 606, a user profile is identified 608. A wish list associated with the user profile is accessed 610. An item on the wish list is identified 612. An advertisement is identified 614 based on the identified item on the wish list. A representation of the advertisement 618 is transmitted from the server 606, via the network 604, to the smart television 600, where it is generated for output. The advertisement associated with the representation of the advertisement 618 may be sent to the smart television 600, via the network 604 and be automatically generated for output. In other examples, a user may need to interact with the representation of the advertisement 618 before the advertisement is generated for output. In other examples, the user may interact with the advertisement, for example, by selecting the advertisement in order to output more information about the item shown in the advertisement, or to purchase an item described in the advertisement. Once the representation of the advertisement 618 and/or the advertisement is generated for output and is output at the smart television 600, the media content 620 is generated for output at the smart television 600. The media content 620 is received via the network 604, from the server 606. Receiving the media content may comprise receiving a manifest file 616, the manifest file indicating a plurality of media content segments. Receiving the first advertisement further comprises adding a plurality of first advertisement segments to the manifest file 616. Similarly, the links to the video advertisement segments can be automatically added to the manifest file for the media content 620 (e.g., when server-side ad insertion or SSAI is utilized). Such bids can take place when the user hits "play" or even while a user is watching live TV. The manifest file may be an HTML 5 manifest file, such as a media presentation description file (.mpd) file for MPEG DASH streaming. In another example, the manifest file may be an M3U8 playlist file (.m3u8) for HTTP live streaming (HLS). The manifest file may describe media content segments for streaming media content and may be appended to describe segments of the advertisement. The manifest file is typically received before any advertisement and/or media content is received at the computing device. In this example, a single representation of an advertisement is generated for output; however, it is also contemplated that two representations of advertisements may be generated for output in a similar manner to that described in connection with FIG. 2.

Figure 7:
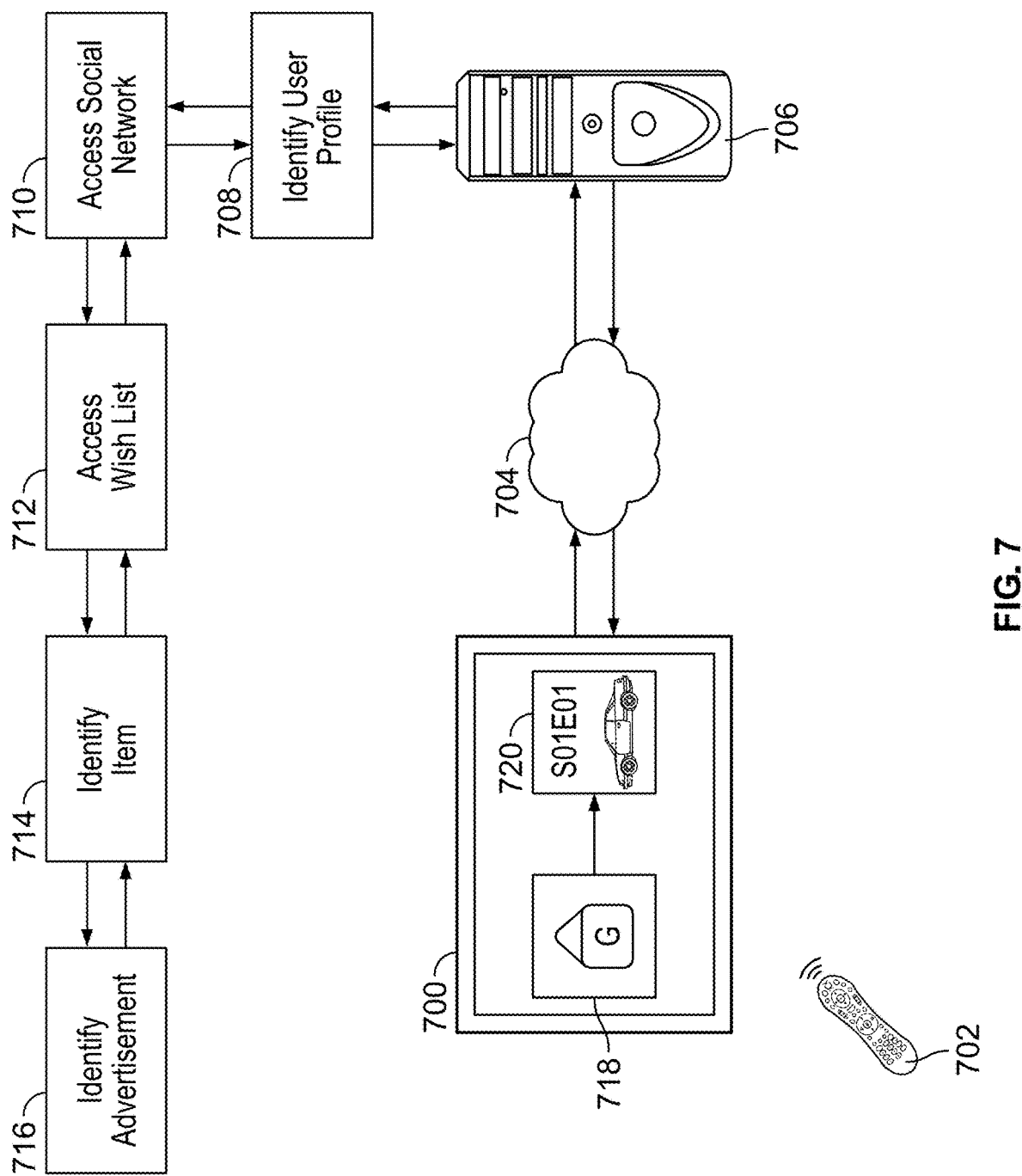
FIG. 7 shows another example environment in which an advertisement, based on an item on a wish list, is generated for output, in accordance with some embodiments of the disclosure.

FIG. 7 shows another example environment in which an advertisement, based on an item on a wish list, is generated for output, in accordance with some embodiments of the disclosure. In a similar manner to the environment depicted in FIGS. 1-6, the environment comprises a computing device, in this example, a smart television 700. A user selects a media content item for viewing via a video sharing application, or an OTT application, with the remote control 702. A request to obtain the media content item is sent via a network 704, such as the internet, to a server 706. In this example, the following steps 708, 710, 712, 714 and 716 are carried out at the same server 706 that receives the request; however, any (including all) of the steps may be carried out at one or more other servers. These other servers may be different physical servers, different virtual machines running on the same server and/or a combination of the two. At the server 706, a user profile is identified 708 and a social network associated with the profile is accessed 710. A user may log on to an OTT platform, such as Amazon Prime, at their smart television 700. The user may have a social network account associated with their OTT platform account. In some examples, the user may use their social network account to log on to the OTT platform. The user may have a wish list stored as part of their social media profile, which may be accessed via the OTT platform. The OTT platform may have an account on the social media platform that a user is connected to, and by connecting to the OTT platform account, the user may enable the OTT platform account to access parts of their social media profile, such as the wish list. A wish list associated with the user profile is accessed 712. An item on the wish list is identified 714. An advertisement is identified 716 based on the identified item on the wish list. A representation of the advertisement 718 is transmitted from the server 706, via the network 704, to the smart television 700, where it is generated for output. The advertisement associated with the representation of the advertisement 718 may be sent to the smart television 700, via the network 704, and be automatically generated for output. In other examples, a user may need to interact with the representation of the advertisement 718 before the advertisement is generated for output. In other examples, the user may interact with the advertisement, for example, by selecting the advertisement in order to output more information about the item shown in the advertisement, or to purchase an item described in the advertisement. Once the representation of the advertisement 718 and/or the advertisement is generated for output and is output at the smart television 700, the media content 720 is generated for output at the smart television 700. The media content 720 is received via the network 704, from the server 706. In this example, a single representation of an advertisement is generated for output; however, it is also contemplated that two representations of advertisements may be generated for output in a similar manner to that described in connection with FIG. 2.

Figure 8:
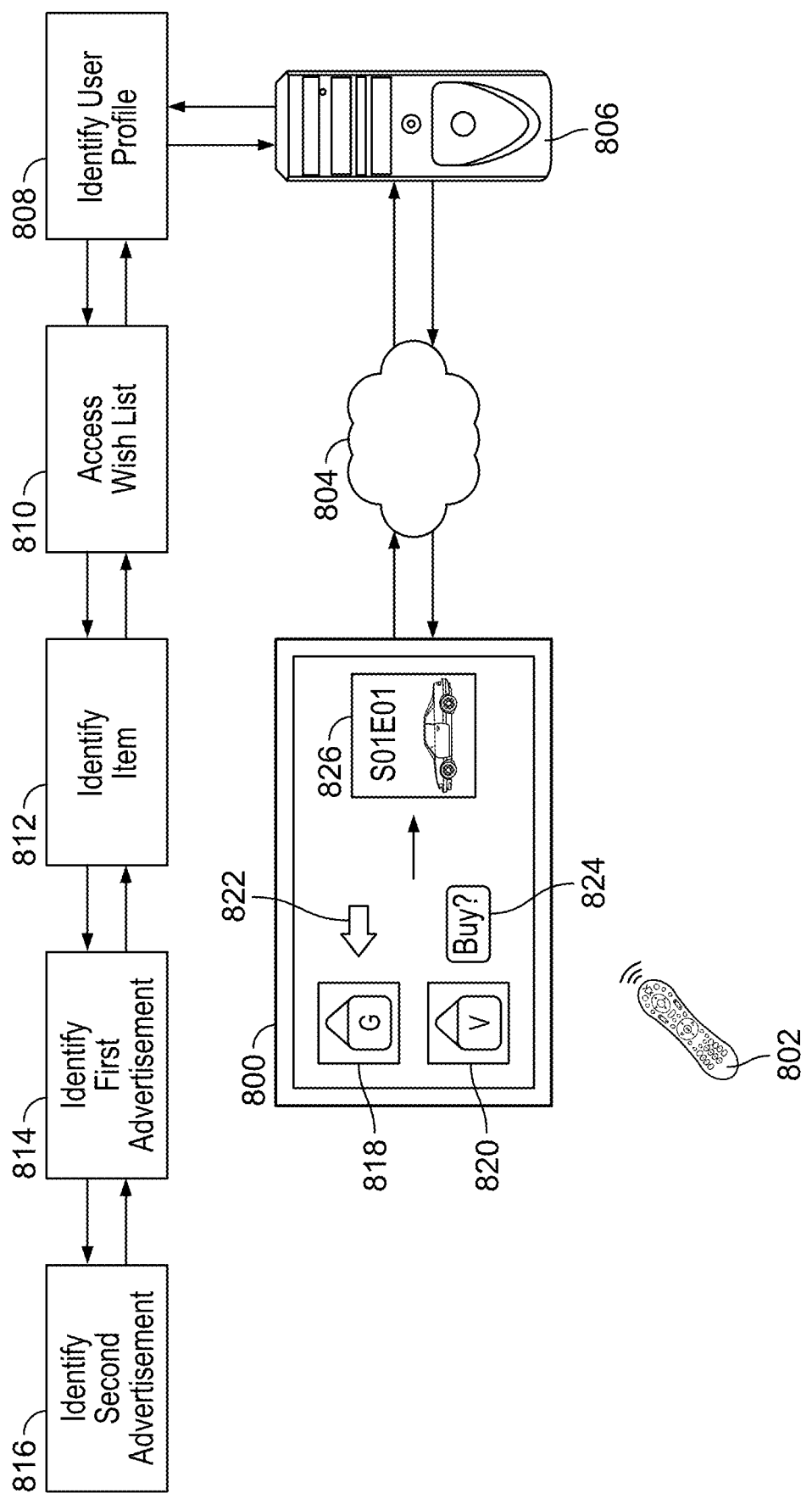
FIG. 8 shows another example environment in which an advertisement, based on an item on a wish list, is generated for output, in accordance with some embodiments of the disclosure.

FIG. 8 shows another example environment in which an advertisement, based on an item on a wish list, is generated for output, in accordance with some embodiments of the disclosure. In a similar manner to the environment depicted in FIGS. 1-7, the environment comprises a computing device, in this example, a smart television 800. A user selects a media content item for viewing on a video sharing application, or an OTT application, with the remote control 802. A request to obtain the media content item is sent via a network 804, such as the internet, to a server 806. In this example, the following steps 808, 810, 812, 814, 816 and 818 are carried out at the same server 806 that receives the request; however, any (including all) of the steps may be carried out at one or more other servers. These other servers may be different physical servers, different virtual machines running on the same server and/or a combination of the two. At the server 806, a user profile is identified 808. A wish list associated with the user profile is accessed 810. An item on the wish list is identified 812 and, based on the identified item on the wish list, a first advertisement is identified 814 and a second advertisement is identified 816. The first advertisement may reflect the exact item that is on the wish list, for example the same brand and model of item. The second advertisement may be for an item that is similar to the item that is shown in the first advertisement, for example, the same type of item, but a different brand and/or model. The second advertisement may, in some examples, be for an item that is on sale or is at a lower price compared to the first advertisement. A representation of the first advertisement 818 and a representation of the second advertisement 820 are transmitted from the server 806, via the network 804, to the smart television 800 where they are generated for output, along with a user interface 822. The user interface 822 may enable a user to select the representation of the first advertisement 818 or the representation of the second advertisement 820 for output. In addition, the user interface 822 may comprise an UI element, such as a button 824, that enables a user to purchase an item associated with the representation of the advertisement or the advertisement. In some examples, the user may already be logged on to an e-commerce site and the selectable element may enable the user to purchase the item without having to provide any additional details. In some examples, if the item is a digital download, then the digital download may automatically be sent to the subject of the wish list. For example, a link to download and/or activate a game and/or digital media content may be sent to the subject of the wish list. In some examples, the digital content may be automatically installed on a computing device associated with subject of the wish list. The user may use the remote control 802 to select the advertisement for output and/or to select the button 824. In other examples, the user may generate a touch event on the touchscreen of a computing device in order to select an advertisement for output and/or to select the button 824. The selected advertisement is sent to the smart television 800, via the network 804, and may be automatically generated for output. In other examples, the user may interact with the advertisement, for example, by selecting the advertisement in order to output more information about the item shown in the advertisement, or to purchase an item described in the advertisement. Once the selected advertisement is generated for output and is output at the smart television 800, the media content 826 is generated for output at the smart television 200. The media content 826 is received via the network 804, from the server 806.

In some examples, the representation of the advertisement and/or the advertisement may comprise a user interface element that enables a user to complete a purchase of an item associated with the representation of the advertisement and/or the advertisement. For example, the user interface element may enable a user to send a link, such as a link to a web page, to a mobile computing device, such as a smartphone. The link may be sent via a messaging service, such as WhatsApp and/or may be displayed to a user via a notification on the computing device. In another example, the user interface element may enable a user to purchase an item via their OTT service. For example, on receiving a selection of a user interface element, the user may be billed via their OTT service and the item may be shipped to an address associated with the OTT service, for example an address associated with a user profile that is logged on to the OTT service. The user interface element may include a sale price and/or lower price that is only valid for a set period of time, in order to entice a user to purchase an item.

In some examples, the advertisement is not directly related to items on a wish list but is based on items that a user has purchased in the past. For example, a user might have purchased an electric toothbrush two years ago, in which case an advertisement selection algorithm might determine that the user might want to buy the newer model. An advertisement in such scenario may be based on the new model and may further comprise an indication that the user purchased an older model two years ago. Similarly, an advertisement can identified in response to an item on wish list, wherein the price has been lowered. In some examples, the wish list may be a user's personal shopping list. In this example, the advertisement can be based on such an item with an indication that the item is on the user's personal shopping list and that the price has been lowered. The lowering of the price may be in response to a brand winning a bid for the advertisement and deciding to make the item available at a lower price for certain period.

FIG. 9 shows a block diagram representing components of a computing device and data flow therebetween for generating an advertisement for output based on an item on a wish list, in accordance with some embodiments of the disclosure. Computing device 900 (e.g., a smart television 100, 200, 300, 400, 500, 600, 700, 800) as discussed above comprises input circuitry 904, control circuitry 908 and an output module 942. Control circuitry 908 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

A user provides an input 902, which is received by the input circuitry 904. The input circuitry 904 is configured to receive a user input related to a computing device. For example, this may be via a touchscreen, keyboard, mouse, microphone, infra-red controller, Bluetooth controller and/or Wi-Fi controller of the computing device 900. The input circuitry 904 transmits 906 the user input to the control circuitry 908.

The control circuitry 908 comprises a media content requesting module 910, a user profile identifying module 914, a wish list accessing module 918, an item identifying module 922, an advertisement identifying module 926, an advertisement representation receiving module 930, a media content receiving module 934, an advertisement representation generating module 938 and a media content generating module 944. The user input is transmitted 906 to the media content requesting module 910. At the media content requesting module 910, a media content item is requested. On requesting the media content item, an indication is transmitted 912 to the user profile identifying module 914, where a user profile is identified. The user profile is transmitted 916 to the wish list accessing module 918, where a wish list is accessed based on the user profile. The wish list is transmitted 920 to the item identifying module 922, where an item on the wish list is identified. The identified item is transmitted 924 to the advertisement identifying module 926, where an advertisement is identified. An indication of the identified advertisement is transmitted 928 to the advertisement representation receiving module 930, where a representation of the advertisement is received. An indication that a representation of the advertisement has been received is transmitted 932 to the media content receiving module 934, where the media content item is received. An indication is transmitted 936 to the output module 938. At the output module 938, the advertisement representation generation module 938 generates a representation of the advertisement for output and an indication is transmitted 942 to the media content generating module 944, where the media content item is generated for output.

FIG. 10 shows a flowchart of illustrative steps involved in generating an advertisement for output based on an item on a wish list, in accordance with some embodiments of the disclosure. Process 1000 may be implemented on any of the aforementioned computing devices (e.g., smart television 100, 200, 300, 400, 500, 600, 700, 800). In addition, one or more actions of the process 1000 may be incorporated into or combined with one or more actions of any other process or embodiments described herein.

At 1002, a request to obtain media content is received. At 1004, a user profile is identified. At 1006, a wish list is accessed. At 1008, an item on the wish list is identified. At 1010, an advertisement is identified. At 1012, a representation of an advertisement is received. At 1014, media content is received. At 1016, a representation of the advertisement is generated. At 1018, a media content item is generated for display.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
 receiving a request to obtain, at a computing device, media content;
 based on the receiving the request to obtain media content:
  identifying a user profile, of a first user, associated with the media content;
  identifying a second user associated with the user profile, wherein the user profile indicates a relationship between the first user and the second user;
  identifying that the relationship between the first user and the second user is one of a friend, a family and/or a colleague;
  accessing, based on the relationship, a wish list associated with the first user and the second user;
  identifying an item on the wish list;
  identifying a first advertisement, wherein the first advertisement is based on the identified item;
  receiving, at the computing device, a representation of the first advertisement;
  receiving, at the computing device, the media content;
  accessing, via the user profile, a calendar;
  correlating by a trained machine learning model, the wish list with an event in the calendar;
 in response to (a) the receiving the request to obtain media content and (b) the correlating by the trained machine learning model, generating, a reminder for the item on the wish list, the reminder comprising a countdown timer counting from a current date to the event;
 generating, at the computing device, a user interface and the representation of the first advertisement for output, wherein the user interface comprises the reminder and an indicator of the second user; and
 generating, at the computing device, the media content for output.

2. The method of claim 1, further comprising:
 identifying a second advertisement, wherein the second advertisement is different from the first advertisement and the second advertisement is based on the identified item;
 receiving, at the computing device, a representation of the second advertisement;
 generating, at the computing device, a representation of the second advertisement for output;
 generating the user interface for output further comprises generating a user interface comprising the representations of the first and second advertisements for output and enabling a selection of the first or second advertisement to be received;

receiving a selection, at the computing device, of the first or second advertisement;
receiving, at the computing device, the selected first or second advertisement; and
generating, at the computing device, the selected first or second advertisement for output.

3. The method of claim 2, wherein the first advertisement is for the identified item and the second advertisement is for an item that is similar to the identified item.

4. The method of claim 2, wherein the user interface further comprises an indication of the wish list from which the item has been identified.

5. The method of claim 2, wherein the user interface further enables an item, based on the representations of the first and/or second advertisements, to be purchased via the user interface.

6. The method of claim 1, wherein the method further comprises receiving an indication that the identified item on the wish list has not been purchased for the user.

7. The method of claim 1, wherein:
identifying the first advertisement further comprises generating the first advertisement by scraping a webpage associated with the identified item; extracting, from the webpage, one or more data items associated with the identified item; and processing the one or more data items; and
receiving the first advertisement further comprises receiving the generated first advertisement.

8. The method of claim 1, wherein:
accessing the wish list further comprises accessing the wish list via an advertising exchange;
identifying the item on the wish list further comprises identifying the item at the advertising exchange; and
identifying the first advertisement further comprises identifying the first advertisement based on a pre-cached bid.

9. The method of claim 1, wherein:
obtaining the media content further comprises receiving a manifest file, the manifest file indicating a plurality of media content segments; and
receiving the first advertisement further comprises adding a plurality of first advertisement segments to the manifest file.

10. The method of claim 1, wherein accessing the wish list further comprises accessing the wish list via a social network associated with the user profile; and wherein a provider of the media content is associated with the user profile via the social network.

11. A system comprising:
input circuitry configured to:
receive a request to obtain, at a computing device, media content; and
control circuitry configured to:
based on the receiving the request to obtain media content:
identify a user profile, of a first user, associated with the media content;
identify a second user associated with the user profile, wherein the user profile indicates a relationship between the first user and the second user;
identify that the relationship between the first user and the second user is one of a friend, a family and/or a colleague;
access, based on the relationship, a wish list associated with the user profile;
identify an item on the wish list;
identify a first advertisement, wherein the first advertisement is based on the identified item;
receive, at the computing device, a representation of the first advertisement;
receive, at the computing device, the media content;
access, via the user profile, a calendar;
correlate, by a trained machine learning model, the wish list with an event in the calendar;
in response to (a) the receiving the request to obtain media content and (b) the correlating by the trained machine learning model, generate, a reminder for the item on the wish list, the reminder comprising a countdown timer counting from a current date to the event;
generate, at the computing device, a user interface and the representation of the first advertisement for output, wherein the user interface comprises the reminder and an indicator of the second user; and
generate, at the computing device, the media content for output.

12. The system of claim 11, wherein:
the control circuitry is further configured to:
identify a second advertisement, wherein the second advertisement is different from the first advertisement and the second advertisement is based on the identified item;
receive, at the computing device, a representation of the second advertisement;
generate, at the computing device, a representation of the second advertisement for output;
the control circuitry configured to generate the user interface for output is further configured to generate a user interface comprising the representations of the first and second advertisements for output and enable a selection of the first or second advertisement to be received; and
the control circuitry is further configured to:
receive a selection, at the computing device, of the first or second advertisement;
receive, at the computing device, the selected first or second advertisement; and
generate, at the computing device, the selected first or second advertisement for output.

13. The method of claim 12, wherein the first advertisement is for the identified item and the second advertisement is for an item that is similar to the identified item.

14. The method of claim 12, wherein the control circuitry configured to generate the user interface is further configured to generate the user interface comprising an indication of the wish list from which the item has been identified.

15. The method of claim 12, wherein the control circuitry configured to generate the user interface is further configured to generate the user interface that enables an item, based on the representations of the first and/or second advertisements, to be purchased via the user interface.

16. The system of claim 11, wherein the control circuitry is further configured to receive an indication that the identified item on the wish list has not been purchased for the user.

17. The method of claim 11, wherein:
the control circuitry configured to identify the first advertisement is further configured to generate the first advertisement by scraping a webpage associated with the identified item; extracting, from the webpage, one or more data items associated with the identified item; and processing the one or more data items; and the control circuitry configured to receive the first advertisement is further configured to receive the generated first advertisement.

18. The method of claim 11, wherein:
the control circuitry configured to access the wish list is further configured to access the wish list via an advertising exchange;
the control circuitry configured to identify the item on the wish list is further configured to identify the item at the advertising exchange; and
the control circuitry configured to identify the first advertisement is further configured to identify the first advertisement based on a pre-cached bid.

19. The method of claim 11, wherein:
the control circuitry configured to obtain the media content is further configured to receive a manifest file, the manifest file indicating a plurality of media content segments; and
the control circuitry configured to receive the first advertisement is further configured to add a plurality of first advertisement segments to the manifest file.

20. The method of claim 11, wherein the control circuitry configured to access the wish list is further configured to access the wish list via a social network associated with the user profile, and wherein a provider of the media content is associated with the user profile via the social network.

* * * * *